(12) United States Patent
Li et al.

(10) Patent No.: US 12,269,745 B2
(45) Date of Patent: Apr. 8, 2025

(54) NATURAL GRAPHITE, MODIFIED NATURAL GRAPHITE MATERIAL PREPARED THEREFROM, PREPARATION METHOD, AND APPLICATIONS

(71) Applicant: BTR NEW MATERIAL GROUP CO., LTD., Shenzhen (CN)

(72) Inventors: Dongdong Li, Shenzhen (CN); Haihui Zhou, Shenzhen (CN); Chengkun Zhou, Shenzhen (CN); Xuan Wu, Shenzhen (CN)

(73) Assignee: BTR NEW MATERIAL GROUP CO., LTD, Guangdong (CN)

( * ) Notice: Subject to any disclaimer, the term of this patent is extended or adjusted under 35 U.S.C. 154(b) by 1170 days.

(21) Appl. No.: 17/043,350

(22) PCT Filed: Aug. 1, 2019

(86) PCT No.: PCT/CN2019/098885
§ 371 (c)(1),
(2) Date: Sep. 29, 2020

(87) PCT Pub. No.: WO2020/107927
PCT Pub. Date: Jun. 4, 2020

(65) Prior Publication Data
US 2021/0017028 A1   Jan. 21, 2021

(30) Foreign Application Priority Data

Nov. 29, 2018  (CN) .......................... 201811443746.4

(51) Int. Cl.
| | | |
|---|---|---|
| C01B 32/20 | (2017.01) | |
| C01B 32/21 | (2017.01) | |
| H01M 4/02 | (2006.01) | |
| H01M 4/587 | (2010.01) | |
| H01M 10/0525 | (2010.01) | |

(52) U.S. Cl.
CPC .............. *C01B 32/20* (2017.08); *C01B 32/21* (2017.08); *H01M 4/587* (2013.01); *H01M 10/0525* (2013.01); *C01P 2004/51* (2013.01); *C01P 2006/11* (2013.01); *C01P 2006/12* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2004/0023115 A1* | 2/2004 | Kato | ................... | H01M 50/124 429/217 |
| 2007/0224510 A1* | 9/2007 | Yamamoto | ............ | H01M 4/622 429/316 |
| 2009/0258298 A1* | 10/2009 | Umeno | ............. | C04B 35/62884 427/113 |
| 2010/0015514 A1* | 1/2010 | Miyagi | ............... | H01M 4/0428 429/129 |
| 2019/0252672 A1 | 8/2019 | Miyagi | | |
| 2019/0273248 A1 | 9/2019 | Yamada | | |

FOREIGN PATENT DOCUMENTS

| | | |
|---|---|---|
| CN | 1481041 A | 3/2004 |
| CN | 1702892 A | 11/2005 |
| CN | 101685858 A | 3/2010 |
| CN | 102347481 A | 2/2012 |
| CN | 102931381 A | 2/2013 |
| CN | 103872294 A | 6/2014 |
| CN | 103897714 A | 7/2014 |
| CN | 105731427 A | 7/2016 |
| CN | 106058211 A | 10/2016 |
| CN | 106328885 A | 1/2017 |
| CN | 106663808 A | 5/2017 |
| CN | 106744916 A | 5/2017 |
| CN | 107112536 A | 8/2017 |
| CN | 108063229 A | 5/2018 |
| EP | 3246974 A1 | 11/2017 |
| IN | 107195903 A | 9/2017 |
| JP | 2007194207 A | 8/2007 |

(Continued)

OTHER PUBLICATIONS

Office Action from corresponding Japanese Application No. 2020-569793, dated Jan. 6, 2022, 6 pages with translation.
The Extended European Search Report from corresponding European Application No. 19890538.2; dated Dec. 23, 2021; 9 pages.
Office Action from corresponding Chinese Application No. 201811443746.4, dated Jan. 5, 2022, 16 pages with translation.
International Search Report from corresponding International Application No. PCT/CN2019/098885, mailed Nov. 18, 2019, 6 pages including translation.

(Continued)

*Primary Examiner* — Jose I Hernandez-Kenney
(74) *Attorney, Agent, or Firm* — Tucker Ellis LLP

(57) ABSTRACT

Provided are a natural graphite, a modified natural graphite material prepared therefrom, a preparation method, and applications. The natural graphite has the following characteristics: a particle size D50 smaller than 10 μm, and D90/D10<2.5; a 002 interplanar spacing ranging from 0.336 to 0.360 nm, $I_{002}/I_{110} \leq 35$; a saturated tap density greater than or equal to 0.6 g/cc and smaller than 1.3 g/cc; and a specific surface area greater than or equal to 1.0 m²/g and smaller than 10.0 m²/g. The provided natural graphite has specific particle size, orientation, tap density and surface area and can serve as a raw material for preparing modified natural graphite material, and the prepared modified natural graphite material has high isotropy and thus has better rate performance and cycle performance.

12 Claims, No Drawings

(56) References Cited

FOREIGN PATENT DOCUMENTS

| | | |
|---|---|---|
| JP | 2013196842 A | 9/2013 |
| JP | 6029200 B2 | 11/2016 |
| KR | 20070096889 A | 10/2007 |

OTHER PUBLICATIONS

Decision to Grant of Patent for Japanese Application No. JP2020-569793, mailed Jul. 19, 2022, 5 pages including translation.
Office Action for Korean Application No. 10-2020-7032516, mailed Oct. 26, 2022, 15 pages including translation.

* cited by examiner

NATURAL GRAPHITE, MODIFIED NATURAL GRAPHITE MATERIAL PREPARED THEREFROM, PREPARATION METHOD, AND APPLICATIONS

TECHNICAL FIELD

The present application pertains to the technical field of anode materials, and relates to a natural graphite, a modified natural graphite material prepared from the natural graphite, a preparation method and applications.

BACKGROUND

With the intensification of global warming, an important and urgent challenge for human society is to control the amount of released $CO_2$. In the transportation field, the development of new energy vehicles is an inevitable trend. Governments of various countries have successively introduced various preferential policies and subsidies to promote the development of new energy vehicles. Under the promotion of these policies, electric vehicles that use lithium-ion batteries as power batteries have developed rapidly. However, due to the problems of high prices and slow charging of the power batteries, the electric vehicles have not yet been fully commercialized. Thus, the current research and development focus is to lower the price and improve performance of power batteries.

A battery cell of a power lithium-ion battery is mainly composed of an anode, an electrolyte, a separator, and a cathode. Among them, the positive and anodes have a decisive influence on the performance of the battery. Therefore, the research and development of the power battery research is concentrated on developing low-cost and excellent electrode materials. As for the anode material, graphite materials are still dominant. Graphite can be classified into artificial graphite and natural graphite in terms of the sources. The artificial graphite is required to undergo an ultra-high temperature graphitization process, leading to difficulty in reducing the price thereof. The natural graphite does not require the high-temperature graphitization process, and thus has a significant advantage of low cost. Therefore, the natural graphite is dominant in the anode material market in the 3 C field. However, the natural graphite, when being applied in the power battery, still has some problems in terms of the performances, especially the rate performance. The common natural graphite generally is in form of larger flakes. The flake graphite will gradually become parallel to a current collector during lamination in the preparation of electrodes, which will greatly reduce the electrolyte permeability of the material and thus is disadvantageous to the rate performance of the battery. It is still difficult to greatly increase the sphericity even if the flake graphite is spheroidized. Normally, the spherical graphite is elliptical, and a longitudinal axis direction of the elliptical particle is a direction along which the flakes are parallel to each other. During the lamination process, the longitudinal axis directions of the ellipsoid particles are parallel to the current collector. In the prepared anode material, most of the flakes are still parallel to the current collector during compression of the graphite of the electrode plate. Therefore, it is urgent to improve orientation of the natural graphite and thus to improve the rate performance of the natural graphite.

CN107195903A discloses a natural graphite anode material for lithium-ion power batteries and a preparation method thereof, the natural graphite anode material having small particle size. In this invention, a "secondary material outlet" is additionally provided between a finished product outlet and a tail material outlet of a crushing equipment for preparing 15-25 μm natural graphite, and it is configured to collect graphite material having a particle size ranging from 5 μm to 25 μm and a tap density greater than 0.65 g/cm³. Then, the graphite material undergoes re-shaping, chemical purification, and asphalt coating carbonization, to obtain a high-capacity natural graphite anode material having small particle diameter. However, this graphite anode material still has poor first coulombic efficiency and rate performance. CN106744916A discloses a method for modifying an anode material of a high-rate lithium-ion battery. The method includes: step 1 of mixing of raw materials, i.e., resin powder and graphite raw material are mixed in a weight ratio of 1:100 to 15:100; step 2 of medium-temperature carbonization treatment: in an inert atmosphere, the temperature is increased to 600-1300° C., and the temperature is maintained for 1-4 h; (3) cooling and classification, to obtain the modified graphite anode material for lithium ion batteries. This invention adopts a specific resin to coat and modify graphite particles to prepare an anode material of lithium-ion batteries, but the composite material prepared with this method has poor rate performance and first coulombic efficiency.

Therefore, it is necessary to develop a preparation method of natural graphite, which has the improved isotropy and the reduced orientation, thereby improving the rate performance and cycle performance of the natural graphite.

SUMMARY

The following is a summary of subject matters, which are described in detail in the present disclosure. The summary is not intended to limit the protection scope of the claims.

An object of the present application is to provide a natural graphite, a modified natural graphite material prepared from the natural graphite, a preparation method and use.

For this purpose, the present application adopts the following technical solutions.

In a first aspect, the present application provides a natural graphite having: a particle size D50 smaller than 10 μm, and D90/D10<2.5; a 002 interplanar spacing in a range of 0.336 to 0.360 nm, $I_{002}/I_{110} \leq 35$; a saturated tap density greater than or equal to 0.6 g/cc and smaller than 1.3 g/cc; and a specific surface area greater than or equal to 1.0 m²/g and smaller than 10.0 m²/g.

The present application provides a natural graphite having specific particle size, orientation, tap density and surface area. The modified natural graphite material prepared from the specifically selected natural graphite has higher isotropy, and thus has excellent rate performance and cycle performance.

The particle size of the present application is measured by using a particle size tester, the 002 interplanar spacing is measured, for example, with XRD, and the specific surface area is measured through nitrogen adsorption and desorption test.

In the present application, the limitations of the natural graphite are all necessary. The modified natural graphite material can only have excellent performances when selecting the above-defined natural graphite. When the average particle size and particle size distribution of the natural graphite are not within the ranges defined in the present application, the processing will result in unsatisfactory solidification effect. If the particle size distribution (D90/D10) is too large, the rate performance of the modified natural graphite will be reduced. When the 002 interplanar spacing and $I_{002}/I_{110}$ of the natural graphite are not within the ranges provided by the present application, the rate performance of the modified natural graphite material will also decrease. If the saturated tap density of the natural graphite goes beyond the range provided by the present application, the processing performance of the modified natural graphite material will be influenced. If the specific surface area of the natural graphite goes beyond the range provided by the present application, the first coulombic efficiency of the modified natural graphite material will be influenced.

The particle size D50 is smaller than 10 μm, for example, 9 μm, 8.5 μm, 8 μm, 7 μm, 6 μm, 4 μm, etc.; and D90/D10<2.5, such as 2.47, 2.45, 2.4, 2.38, 2.35, 2.2, 2.0, 1.8, 1.5, etc.

The $I_{002}/I_{110}$ is smaller than 35, for example, 34, 33.5, 33.2, 33, 32.4, 32, 30, etc.

The saturated tap density is greater than or equal to 0.6 g/cc and smaller than 1.3 g/cc, for example, 0.65 g/cc, 0.7 g/cc, 0.75 g/cc, 0.8 g/cc, 0.85 g/cc, 0.9 g/cc, 1.0 g/cc, 1.1 g/cc, 1.2 g/cc, etc.

The specific surface area is greater than or equal to 1.0 $m^2/g$ and smaller than 10.0 $m^2/g$, such as 2 $m^2/g$, 2.5 $m^2/g$, 3 $m^2/g$, 3.5 $m^2/g$, 4 $m^2/g$, 5 $m^2/g$, 5.5 $m^2/g$, 6 $m^2/g$, 7 $m^2/g$, 8 $m^2/g$, 9 $m^2/g$, etc.

Optionally, the natural graphite is obtained by crushing natural flake graphite or by crushing and shaping microcrystalline graphite.

The natural graphite provided in the present application may be screened natural flake graphite, or may be prepared by a preparation method.

In a second aspect, the present application provides a modified natural graphite material. The modified natural graphite material is prepared with the natural graphite described in the first aspect.

In a third aspect, the present application provides a preparation method of the modified natural graphite material according to the second aspect. The preparation method includes: modifying the natural graphite to obtain the modified natural graphite material.

In the present application, the said modifying includes: sequentially performing a solidification, an isotropic treatment, a carbonization treatment, and a crushing on the natural graphite.

The natural graphite with the above characteristics is first bonded and solidified, and then can be treated with an isotropic process to further improve the isotropy of the natural graphite. Compared with the related art, the treatment manners of the present application is more effective in obtaining the modified natural graphite with high isotropy.

Optionally, the solidification is performed with a solidifying agent selected from phenolic resin, epoxy resin, petroleum resin, coal pitch, petroleum pitch, mesophase pitch, coal tar, heavy oil, and combinations thereof; and the solidifying agent has a softening point in a range of 20° C. to 300° C., for example, 40° C., 50° C., 60° C., 80° C., 100° C., 120° C., 150° C., 180° C., 200° C., 220° C., 250° C., 280° C., etc.

Optionally, a mass ratio of the natural graphite to the solidifying agent is 1:(0.05-1), for example, 1:0.1, 1:0.2, 1:0.3, 1:0.4, 1:0.5, 1:0.6 , 1:0.7, 1:0.8, 1:0.9, etc.

Optionally, the solidification is performed under heating and stirring.

Optionally, the heating is performed at a temperature ranging from 50° C. to 800° C., for example, 100° C., 200° C., 400° C., 500° C., 600° C., 700° C., etc.

Optionally, the stirring is performed for 0 min to 300 min, for example, 1 min, 5 min, 10 min, 50 min, 80 min, 120 min, 150 min, 180 min, 200 min, 220 min, 250 min, 280 min, etc.

Optionally, the isotropic treatment is selected from the group consisting of a cold isostatic pressing treatment, a hot isostatic pressing treatment, a molding treatment, and combinations thereof.

Optionally, the carbonization treatment is performed at a temperature ranging from 1000° C. to 3000° C., for example, 1200° C., 1500° C., 1800° C., 2000° C., 2200° C., 2500° C., 2800° C., etc.

Optionally, the carbonization treatment is performed in in an atmosphere of an inert gas. Optionally, the inert gas is selected from the group consisting of helium, neon, argon, nitrogen, krypton, and combinations thereof.

Optionally, the preparation method, after the crushing, further includes sieving.

Optionally, the particle size D50 of the sieved product is greater than or equal to 7 μm and smaller than or equal to 18 μm, for example, 8 μm, 9 μm, 10 μm, 11 μm, 12 μm, 13 μm, 14 μm, 15 μm, 16 μm, 17 μm, etc.

The preparation method of the modified natural graphite material of the present application has simple process and high practicability, and it is easy to be performed and requires low cost.

In a fourth aspect, the present application provides a lithium ion battery including the modified natural graphite material described in the second aspect.

Optionally, an anode plate of the lithium ion battery includes the modified natural graphite material described in the second aspect.

Compared with the related art, the present application has the following beneficial effects:

(1) The present application provides a natural graphite with specific particle size, orientation, tap density and surface area, the natural graphite is used as a raw material for preparing a modified natural graphite material, and the prepared modified natural graphite material has high isotropy and thus has better rate performance and cycle performance;

(2) The natural graphite having the above characteristics is first bonded and solidified, and then can be treated with an isotropic process to further improve the isotropy of the natural graphite. Compared with the related art, the treatment method of the present application is more effective in obtaining a modified natural graphite with high isotropy;

(3) The modified natural graphite material obtained by the preparation method according to the present application has a capacity retention rate exceeding 94% for 5 C/1 C discharge at room temperature, and a capacity retention rate exceeding 90.2% after 300 cycles of 1 C/1 C charge and discharge.

Other aspects will be clear upon reading and understanding the detailed description with reference to accompanying drawings.

DESCRIPTION OF EMBODIMENTS

The technical solutions of the present application are further described below with reference to specific embodiments. Those skilled in the art can understand that these embodiments are merely to explain the present application, but are not intended to limit the present application.

Example 1

A modified natural graphite material was prepared with the following method.

Natural graphite (D50=6 μm, D90/D10=2.48, $I_{002}/I_{110}$≤33.2, saturation tap density of 0.62 g/cc, specific surface area of 9.4 m$^2$/g) and petroleum pitch (softening point of 140° C.) were mixed in a ratio of 1:0.25, then the mixture was placed into a specific reaction kettle, stirred and heated at a temperature of 360° C. for 3 hours. The heated mixture was subjected to a cold isostatic pressing treatment under a pressure of 120 MPa for 2 min. After the isostatic pressing treatment, the product was subjected to a carbonization treatment at 2800° C., and then the material was crushed to have a particle size similar as the original material and sieved to obtain a modified natural graphite material having a D50 of 8.3 μm.

Examples 2 to 5

Examples 2 to 5 differ from Example 1 merely in that mass ratios of natural graphite to coal pitch were respectively 1:0.05 (Example 2), 1:1 (Example 3), 1:0.01 (Example 4), and 1:2 (Example 5).

Example 6

Example 6 differs from Example 1 merely in that the solidifying agent is phenolic resin having a softening point of 110° C.

Example 7

Natural graphite (D50=8 μm, D90/D10=2.41, $I_{002}/I_{110}$≤34.2, saturation tap density of 0.76 g/cc, and specific surface area of 6.9 m$^2$/g) and coal pitch (softening point of 90° C.) were mixed in a ratio of 1:0.3, and then the mixture was placed into a specific reaction kettle, stirred and heated at a temperature of 260° C. for 3 hours. The heated material was subjected to a cold isostatic pressing treatment under a pressure of 110 MPa for 1 min. After the isostatic pressing treatment, the product was subjected to a carbonization treatment at 2800° C., and then the material was crushed to have a particle size similar as the original material and sieved to obtain a modified natural graphite material having a D50 of 11.1 μm.

Example 8

Natural graphite (D50=9.8 μm, D90/D10=2.47, $I_{002}/I_{110}$=34.8, tap density of 0.86 g/cc, specific surface area of 6.1 m$^2$/g) and coal pitch (softening point of 180° C.) were mixed in a ratio of 1:0.2, and then the mixture was placed into a specific reaction kettle, stirred and heated at a temperature of 360° C. for 3 hours. The heated material was subjected to a cold isostatic pressing treatment under a pressure of 80 MPa for 1 min. After the isostatic pressing treatment, the product was subjected to carbonization treatment at 1200° C., and then the material was crushed to have a particle size similar as the original material and sieved to obtain a modified natural graphite material having a D50 of 12.8 μm.

Comparative Example 1

Comparative Example 1 differs from Example 1 merely in that D50 of the natural graphite was 15 μm.

Comparative Example 2

Comparative Example 2 differs from Example 1 merely in that D90/D10 of the natural graphite was 2.64.

Comparative Example 3

Comparative Example 3 differs from Example 1 merely in that $I_{002}/I_{110}$ of natural graphite was 48

Comparative Example 4

Comparative Example 4 differs from Example 1 merely in that the saturation tap density of natural graphite was 0.42 g/cc.

Comparative Example 5

Comparative Example 5 differs from Example 1 merely in that the specific surface area of natural graphite was 12 m$^2$/g.

Performance Test

The modified natural graphite material powders prepared in Examples 1-8 and Comparative Examples 1-5 were tested with the following methods.

(1) The particle size was measured by using a particle size tester;

(2) XRD test is performed with an XRD tester; and (3) The specific surface area is measured by using nitrogen adsorption and desorption instrument.

The modified natural graphite materials prepared in Examples 1-8 and Comparative Examples 1-5 were used to prepare anode plates and batteries, with the following methods.

Anode plate: the modified natural graphite material, as an anode active material of an anode plate, was mixed uniformly with a conductive agent, CMC and SBR according to a mass ratio of 95:1.5:1.5:2 (active material:conductive agent:CMC:SBR), then coated on a copper foil current collector, and dried to obtain an anode plate.

Battery: the modified natural graphite material as provided, a conductive agent, CMC, and SBR were mixed in a mass ratio of 95:1.5:1.5:2, and coated onto a copper foil to obtain an anode plate; a cathode active material LiCoO$_2$, a conductive agent, and PVDF were mixed evenly according to a mass ratio of 96.5:2:1.5 and then coated on an aluminum foil to obtain a cathode plate; the electrolyte was 1 mol/L of a mixture of LiPF$_6$+EC+EMC; and the separator was a polyethylene/propylene composite microporous membrane.

Performances of the prepared anode plates and batteries were tested with the following methods.

(4) Specific capacity and first coulombic efficiency: the prepared anode plate was subjected to a button battery test, the battery was assembled in an argon glove box, a metal lithium plate was used as the anode, the electrolyte was 1 mol/L of a mixture of LiPF$_6$+EC+EMC, and the separator was a polyethylene/propylene composite microporous membrane. The electrochemical performance was tested on a battery test cabinet (5V, 1 A, Neware) at a charge and discharge voltage of 0.01V to 1.5V with a charge and discharge rate of 0.1 C, in order to measure the specific capacity and first coulombic efficiency.

(5) Full battery test: the prepared negative and cathode plates were assembled to a 18650 cylindrical battery, which is prepared for subsequent tests after capacity sorting.

Capacity retention rate of 5 C/1 C discharge was measured with a method including: a. after the capacity sorting, continuously charging a battery at 1 C and discharging the battery at 1 C for three times, and calculating an average of the three discharges as 1 C discharge capacity; then continuously charging the same battery at 1 C and discharging it at 5 C for 5 times, and calculating an average of the last three discharges as 5 C discharge capacity; and dividing the 5 C discharge capacity by the 1 C discharge capacity to obtain the 5 C/1 C discharge capacity retention rate.

The 1 C/1 C capacity retention rate was measured with a method including: charging continuously a battery at 1 C and discharging the battery at 1 C for 300 cycles, with an interval of 1 minute between two successive charge-discharge cycles.

The test results are shown in Table 1.

TABLE 1

| Sample | Particle size D50 (μm) | $I_{002}/I_{110}$ | Specific capacity (mAh/g) | First coulombic efficiency/% | 5C/1C discharge capacity retention rate | 1C/1C discharge capacity retention rate |
|---|---|---|---|---|---|---|
| Example 1 | 8.3 | 33.1 | 363.1 | 95.9 | 96.1 | 93.3 |
| Example 2 | 6.4 | 33.9 | 364.9 | 93.6 | 96.3 | 91.5 |
| Example 3 | 11.2 | 30.8 | 356.6 | 96.2 | 95.8 | 92.3 |
| Example 4 | 6.2 | 33.4 | 368.2 | 90.2 | 96.4 | 91.1 |
| Example 5 | 12.6 | 30.1 | 348.1 | 95.9 | 92.6 | 91.0 |
| Example 6 | 9.1 | 33.4 | 360.5 | 94.2 | 95.9 | 91.2 |
| Example 7 | 11.1 | 36.2 | 362.1 | 96.1 | 94.4 | 93.1 |
| Example 8 | 12.8 | 34.2 | 353.4 | 94.7 | 94.6 | 92.3 |
| Comparative Example 1 | 17.2 | 41.5 | 361.9 | 96.2 | 89.5 | 91.3 |
| Comparative Example 2 | 9.4 | 42.6 | 362.4 | 95.1 | 92.3 | 90.6 |
| Comparative Example 3 | 9.3 | 49.6 | 361.4 | 95.3 | 91.3 | 90.3 |
| Comparative Example 4 | Processing performance was too poor to be measured. | | | | | |
| Comparative Example 5 | 9.6 | 34.2 | 360.2 | 93.2 | 94.6 | 89.2 |

In view of the examples and test results, it is obvious that the modified natural graphite material provided in the present application has a specific capacity greater than or equal to 348 mAh/g, a first coulombic efficiency greater than or equal to 90.2%, a 5 C/1 C discharge capacity retention rate greater than or equal to 94%, and a 1 C/1 C discharge capacity retention rate greater than or equal to 91%. Through the comparison of Examples 1-3 with Examples 4-5, it can be seen that, when the mass ratio of the natural graphite of the present application and the solidifying agent is 1:(0.05-1), the obtained material has better performances. It can be known through the comparison between Example 1 and Comparative Examples 1-5 that, when the selected raw material for preparation goes beyond the scope defined by the present application, although the specific capacity and the first coulombic efficiency are not significantly different, the modified natural graphite material obtained in the present application has better rate performance. Therefore, only the modified natural graphite material prepared with using the natural graphite defined in the present application and by the preparation method provided in the present application has better performance.

The above-mentioned embodiments are described to explain the detailed method of the present application, but are not intended to limit the present application. That is, the present application can be implemented not merely depending upon the above-mentioned detailed method. Those skilled in the art understand that any improvements to the present application, equivalent replacements of raw materials of the product of the present application, additions of auxiliary components, selections of specific methods, etc., shall fall within the protection scope and the disclosure of the present application.

What is claimed is:

1. A preparation method of modified natural graphite material, the preparation method comprising:
   sequentially performing a solidification, an isotropic treatment, a carbonization treatment, and a crushing on a natural graphite as a raw material to obtain the modified natural graphite material,
   wherein the natural graphite is prepared by crushing natural flake graphite, and
   wherein the natural graphite has all of the following features:
   a particle size D50 smaller than 10 μm, and D90/D10<2.5;
   a 002 interplanar spacing in a range of 0.336 to 0.360 nm, and $30 \leq I_{002}/I_{110} \leq 35$;
   a saturated tap density greater than or equal to 0.6 g/cc and smaller than 1.3 g/cc; and
   a specific surface area greater than or equal to 1.0 m²/g and smaller than 10.0 m²/g.

2. The preparation method according to claim 1, wherein the solidification is performed with a solidifying agent selected from phenolic resin, epoxy resin, petroleum resin, coal pitch, petroleum pitch, mesophase pitch, coal tar, heavy oil, and combinations thereof, and
   wherein the solidifying agent has a softening point in a range of 20° C. to 300° C.

3. The preparation method according to claim 1, wherein a mass ratio of the natural graphite to the solidifying agent is 1:(0.05-1).

4. The preparation method according to claim 1, wherein the carbonization treatment is performed at a temperature ranging from 1000° C. to 3000° C.

5. The preparation method according to claim 1, wherein the preparation method, after the crushing, further comprises sieving.

6. The preparation method according to claim 5, wherein the sieved material has a particle size D50 satisfying 7 μm≤D50≤18 μm.

7. The preparation method according to claim 1, wherein the solidification is performed under heating and stirring.

8. The preparation method according to claim 7, wherein the heating is performed at a temperature ranging from 50° C. to 800° C.

9. The preparation method according to claim 7, wherein the stirring is performed for 0 min to 300 min.

10. The preparation method according to claim 1, wherein the isotropic treatment is selected from the group consisting of a cold isostatic pressing treatment, a hot isostatic pressing treatment, a molding treatment, and combinations thereof.

11. The preparation method according to claim 1, wherein the carbonization treatment is performed in an atmosphere of an inert gas.

12. The preparation method according to claim 11, wherein the inert gas is selected from the group consisting of helium, neon, argon, nitrogen, krypton, and combinations thereof.

* * * * *